(12) United States Patent
Clarke et al.

(10) Patent No.: US 10,631,472 B2
(45) Date of Patent: Apr. 28, 2020

(54) CLAMPING DEVICES

(71) Applicant: GRIPPLE LIMITED, Sheffield, South Yorkshire (GB)

(72) Inventors: Neil Clarke, Sheffield (GB); John Butterworth, Sheffield (GB)

(73) Assignee: GRIPPLE LIMITED (GB)

( * ) Notice: Subject to any disclaimer, the term of this patent is extended or adjusted under 35 U.S.C. 154(b) by 210 days.

(21) Appl. No.: 15/532,208

(22) PCT Filed: Dec. 17, 2015

(86) PCT No.: PCT/GB2015/000324
§ 371 (c)(1),
(2) Date: Jun. 1, 2017

(87) PCT Pub. No.: WO2016/102907
PCT Pub. Date: Jun. 30, 2016

(65) Prior Publication Data
US 2018/0263197 A1    Sep. 20, 2018

(30) Foreign Application Priority Data

Dec. 16, 2015 (GB) .................................. 1522204.5

(51) Int. Cl.
*A01G 17/06* (2006.01)
*F16M 13/02* (2006.01)
(Continued)

(52) U.S. Cl.
CPC .............. *A01G 17/06* (2013.01); *F16B 7/22* (2013.01); *F16B 45/00* (2013.01); *F16G 11/00* (2013.01);
(Continued)

(58) Field of Classification Search
CPC ... Y10T 24/3984; F16G 11/101; E04H 17/02; E04H 17/04; E04H 17/06; E04H 17/10; E04H 17/12
(Continued)

(56) References Cited

U.S. PATENT DOCUMENTS 746,671 A * 12/1903 Carter .................... H01B 17/22
174/168
812,287 A * 2/1906 Nagel ...................... H01R 4/44
140/51
(Continued)

FOREIGN PATENT DOCUMENTS

CA        941583      2/1974
DE        20314436    11/2003
(Continued)

*Primary Examiner* — Terrell L McKinnon
*Assistant Examiner* — Michael McDuffie
(74) *Attorney, Agent, or Firm* — Clark Hill PLC; James R. Foley

(57) ABSTRACT

A clamping device (10) comprises a body (30), a clamping arrangement (50) in the body for clamping a flexible elongate member (12). A first cooperating formation (36) cooperates with a second cooperating formation (18). The second cooperating formation is part of a support arrangement (14) to support the clamping device. The first cooperating formation comprises a pair of opposed side portions (38A) and a bridging portion (38B) extending between the side portions.

15 Claims, 7 Drawing Sheets

(51) Int. Cl.
*F16G 11/10* (2006.01)
*F16G 11/00* (2006.01)
*F16B 7/22* (2006.01)
*F16B 45/00* (2006.01)

(52) U.S. Cl.
CPC ......... *F16G 11/108* (2013.01); *F16M 13/022* (2013.01)

(58) Field of Classification Search
USPC .. 248/66, 689, 690, 692, 58, 59, 61, 62, 63, 248/73, 74.1, 229.1, 220.21, 220.22, 248/221.11, 222.13, 316.1; 256/13.1, 54, 256/50, 52
See application file for complete search history.

(56) References Cited

U.S. PATENT DOCUMENTS

| | | | | |
|---|---|---|---|---|
| 917,154 A * | 4/1909 | Sales | ........ | E04H 17/10 256/54 |
| 942,086 A * | 12/1909 | Lindsay | ........ | H01B 17/24 174/154 |
| 1,066,299 A * | 7/1913 | Meyer | ........ | E04H 17/10 24/134 R |
| 1,892,222 A * | 12/1932 | Russell | ........ | E01F 15/06 248/66 |
| 1,973,411 A * | 9/1934 | Ihlenfeldt | ........ | E04H 17/10 256/50 |
| 2,858,106 A * | 10/1958 | Anton | ........ | E04H 17/10 254/389 |
| 3,551,883 A | 12/1970 | Pasbrig | | |
| 4,143,859 A * | 3/1979 | Tews | ........ | E04H 17/20 256/19 |
| 4,213,589 A * | 7/1980 | Pierron | ........ | F16B 2/10 24/327 |
| 4,519,162 A | 5/1985 | Stuckey | | |
| 4,642,940 A | 2/1987 | Ettema et al. | | |
| 4,684,107 A * | 8/1987 | Robbins, Jr. | ........ | A01K 3/00 256/13.1 |
| 5,015,023 A * | 5/1991 | Hall | ........ | F16G 11/048 24/115 G |
| 5,147,145 A * | 9/1992 | Facey | ........ | F16G 11/108 24/136 A |
| 6,405,479 B1 * | 6/2002 | Sherman | ........ | A01G 17/08 47/46 |
| 6,489,566 B1 * | 12/2002 | Durin | ........ | H02G 3/0443 174/135 |
| 7,032,276 B1 * | 4/2006 | Olson | ........ | A44B 11/10 24/115 G |
| 7,637,481 B2 * | 12/2009 | Forero | ........ | E04H 17/12 256/54 |
| 9,000,299 B2 * | 4/2015 | Ruth | ........ | H02G 3/32 174/40 CC |
| 9,534,660 B2 * | 1/2017 | Ferreira | ........ | F16G 11/10 |
| 9,558,682 B2 * | 1/2017 | Dreisbach | ........ | F16G 11/14 |
| 2009/0094798 A1 * | 4/2009 | Yao | ........ | A43C 1/00 24/115 G |
| 2013/0118069 A1 | 5/2013 | Hunt et al. | | |
| 2013/0328002 A1 * | 12/2013 | Hendricks | ........ | E04H 17/10 256/35 |

FOREIGN PATENT DOCUMENTS

| | | |
|---|---|---|
| EP | 1338193 | 8/2003 |
| FR | 2547368 | 12/1984 |
| GB | 2446501 | 8/2008 |
| NL | 7512721 | 1/1976 |
| WO | 2010012989 | 2/2010 |
| WO | 2016025999 | 2/2016 |

* cited by examiner

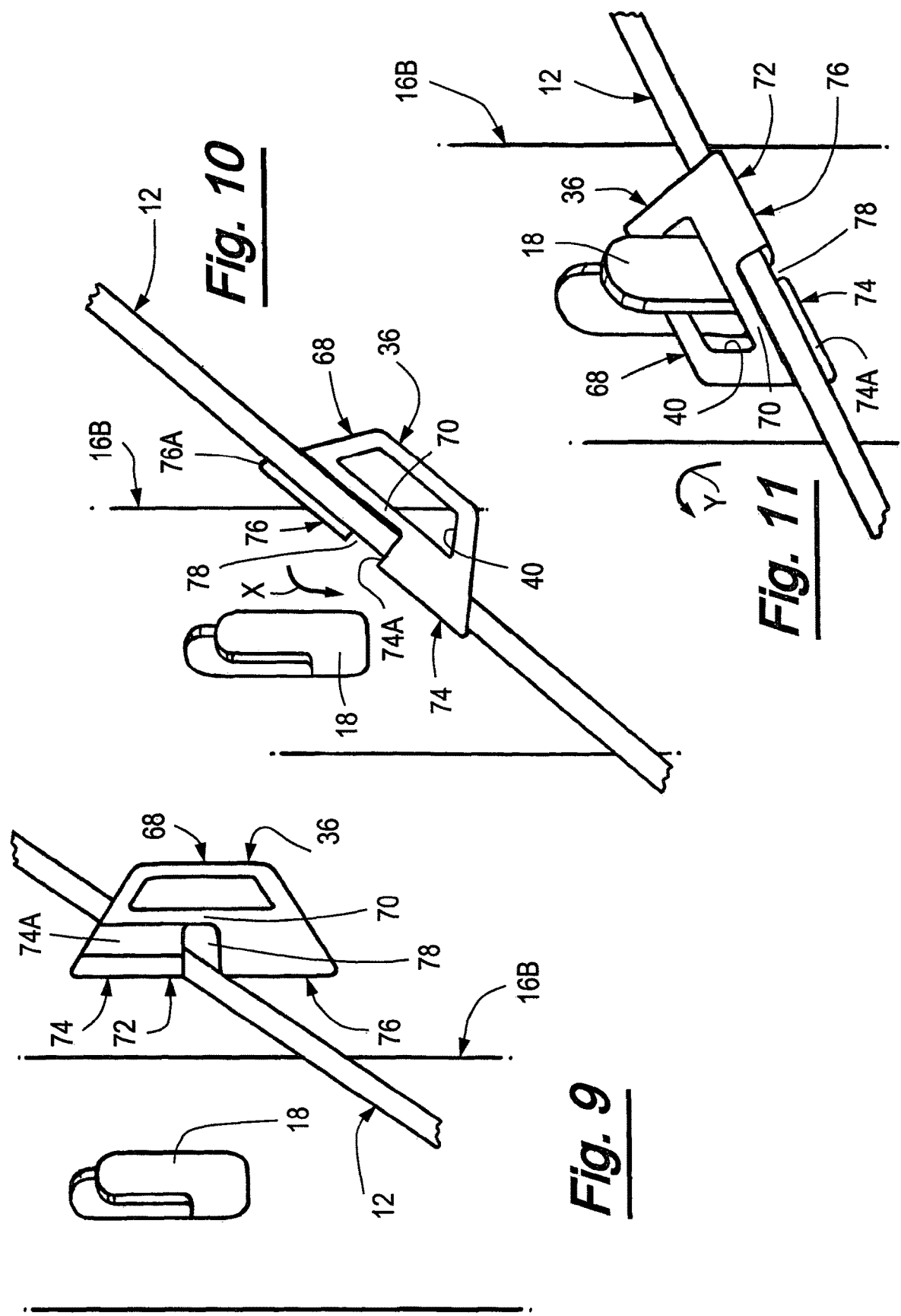

CLAMPING DEVICES

BACKGROUND OF THE INVENTION

This invention relates to clamping devices. This invention also relates to securing assemblies comprising clamping devices. This invention also relates to protecting devices.

In vineyards, the vines are supported by wires that extend between posts. The cables are held on the posts in a manner that allows them to be moved up or down depending upon the stage of the growing cycle. However, with present systems, the supports for the wires, and the wires themselves, can become damaged.

BRIEF SUMMARY OF THE INVENTION

According to one aspect of this invention, there is provided a clamping device comprising a body, a clamping arrangement in the body for clamping a flexible elongate member, and a first cooperating formation for cooperating with a second cooperating formation, said second cooperating formation being part of a support arrangement to support the clamping device.

According to another aspect of this invention, there is provided a securing assembly comprising a clamping device having a body, a clamping arrangement in the body, and a first cooperating formation on the body, the securing assembly further including a flexible elongate member which can be clamped by the clamping arrangement, and a support arrangement for supporting the clamping device, the support arrangement comprising a second cooperating formation, wherein the first cooperating formation can cooperate with the second cooperating formation to support the clamping device.

The support arrangement may comprise a plurality of the second cooperating formations arranged one above the other on a support member.

One of the first and second cooperating formations may comprise a hook portion. The other of the first and second cooperating formations may comprise a receiving formation for receiving the hook portion. The first cooperating formation may comprise the receiving formation. The second cooperating formation may comprise the hook portion.

The receiving formation may comprise a pair of opposed side portions. The receiving formation may include a bridging portion extending between the side portions. The receiving formation may comprise a substantially U shaped member. The receiving formation may define a hook portion receiving aperture for receiving the hook portion.

The body may define a through passage for the elongate member. A guide formation may extend towards the through passage. The clamping arrangement may comprise a clamping member, which may be movable along the guide formation towards the through passage to clamp the elongate member in the through passage.

The body may define a space in communication with the through passage. The guide formation may extend along the space. The guide formation may constitute a wall of the space. The guide formation may be inclined relative to the through passage.

The clamping arrangement may further include an urging member to urge the clamping member towards the through passage.

The clamping member may be a cylindrical or spherical member, or a wedge. The urging member may comprise a spring, such as a compression spring.

The through passage may extend along an engaging wall, which may be provided by the body. The clamping member may be urged by the urging means towards the article engaging wall. The clamping member may be configured to clamp the elongate member against the engaging wall.

The flexible elongate member may be a wire, wire rope, cable or the like.

In a first embodiment, support arrangement may comprise a support member and at least one second formation on the support member. The support arrangement may comprise a plurality of the second formations on the support member.

The plurality of second formations may be arranged sequentially in a vertical array on the support member. In the first embodiment, each second formation may be integrally formed with the support member. The support member may comprise a post.

In a second embodiment, the support arrangement may comprise a mounting member and a second cooperating formation on the mounting member. The mounting member may be capable of being fastened to a support member, such as a post.

According to a further aspect of this invention, there is provided a support arrangement for use in a securing assembly as claimed in claim 6, said support arrangement comprising a mounting member and a second cooperating formation on the mounting member to cooperate with a first cooperating formation on a clamping device, the mounting member being capable of being fastened to a support member.

Thus, in the second embodiment, a plurality of the support arrangements may be fastened to the support member, and the plurality of support arrangements may be arranged sequentially in a vertical array on the support member. The support member may comprise a post.

In a third embodiment, the second cooperating formation may comprise a hook portion. The second cooperating formation may define opposite recesses to hold the first cooperating formation.

In the third embodiment, the support arrangement may comprise the mounting member, and the second cooperating formation may extend upwardly from the mounting member. The second cooperating formation may extend from an outer edge of the mounting member. Desirably, the outer edge of the mounting member is an upper edge.

According to another aspect of this invention there is provided a method of using a securing assembly as described above, said method comprising providing an elongate member and a clamping device, securing the clamping device at one end region of the elongate member, the clamping device having a first cooperating formation, providing a support arrangement having a plurality of second cooperating formations arranged in a vertical array, and supporting the clamping device on a selected one of the second cooperating formations by effecting cooperation between the first and the selected second cooperating formations, and moving the clamping device to another selected second cooperating formation by effecting cooperation between the first and the other selected second cooperating formations.

The method may comprise providing two clamping devices, securing each clamping device at respective opposite end regions of the elongate member, each clamping device having a respective first cooperating formation. The method may further comprise providing two support arrangements, each having a plurality of the second cooperating formations arranged in a vertical array, and supporting each clamping device on a selected one of the second cooperating formations of the respective support arrangements by effecting cooperation between the respective first and the selected second cooperating formations.

Each clamping device may be moved to a selected further second cooperating formation to support each clamping device on the respective selected further second cooperating formation by effecting cooperation between the first and the selected further second cooperating formations.

The aforesaid support arrangements may constitute end support arrangements.

The securing assembly may further include a protecting device for protecting the elongate member from damage. The securing assembly may comprise a plurality of intermediate support arrangements between the end support arrangements. The securing assembly may comprise a plurality of protecting devices. Each protecting device may secure the elongate member to a respective support arrangement.

The protecting device may comprise a main part and a channel arrangement on the main part to receive the elongate member therethrough. The channel arrangement may comprise a first channel portion to receive a first region of the elongate member, and a second channel portion to receive a second region of the elongate member.

The first and second channel portions may be aligned with each other. The first channel portion may be spaced from the second channel portion to define a gap therebetween.

The first channel portion may have a first elongate opening along a first side of the main part to receive said first region of the elongate member. The second channel portion may have a second elongate opening along a second side opposite side of the main part to receive said first region of the elongate member. The first and second openings may face in opposite directions.

Thus, by arranging the protecting device on the elongate member so that the elongate member is received in the aforesaid gap, the protecting device can be rotated so that the first region of the elongate member is received in the first channel portion and the second region of the elongate member is received in the second channel portion.

The protecting device may include one of the first cooperating formations on the main part to cooperate with a selected one of the second cooperating formations on an intermediate support arrangement between the aforesaid two end support arrangements.

The method may comprise providing a plurality of protecting devices, mounting the protecting devices at spaced regions of the elongate member, providing a plurality of intermediate support arrangements, each having a plurality of the second cooperating formations arranged in a vertical array.

The method may include supporting each protecting device on a selected one of the second cooperating formations of the respective intermediate support arrangements by effecting cooperation between the respective first and the selected second cooperating formations.

The method may further include moving each protecting device to a selected further second cooperating formation to support each protecting device on the respective selected further second cooperating formation by effecting cooperation between the first and the selected further second cooperating formations.

BRIEF DESCRIPTION OF SEVERAL VIEWS OF THE DRAWINGS

An embodiment of the invention will now be described with reference to the accompanying drawings, in which:

FIGS. 9, 10 and 11 are schematic drawings showing the mounting of the protecting device on the elongate member and attaching the protecting device to the support arrangement.

DETAILED DESCRIPTION OF THE INVENTION

Figure 1:
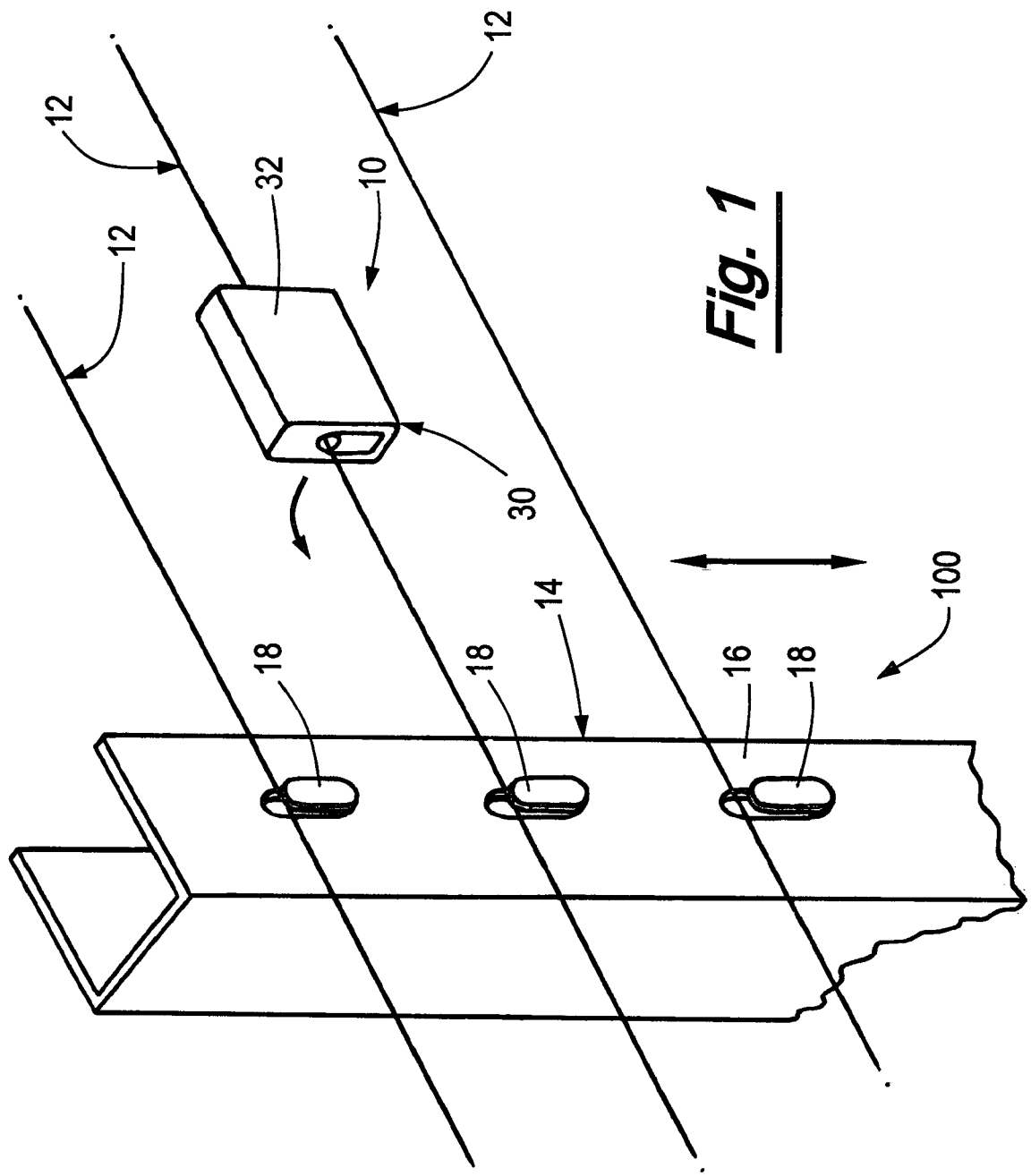
FIG. 1 is a schematic view of a part of a securing assembly showing a clamping device and a first embodiment of a support arrangement.

FIG. 1 shows a part of a securing assembly 100, which comprises a clamping device 10, and an elongate member 12 in the form of a cable, wire, wire rope or the like, which can be clamped by the clamping device 10. The clamping device 10 includes a first cooperating formation 36 (see FIG. 3), which is described in more detail below.

The securing assembly 100 further includes a support arrangement 14 comprising an upright support member 16 in the form of a post and a second cooperating formation in the form of a hook portion 18. The first and second cooperating formations cooperate with each other so that the clamping device 10 can be supported on the support arrangement 14.

A plurality of the hook portions 18 are provided on the support member 16. The hook portions 18 are arranged one above the other lengthwise of the support member 16, so that, in use, the hook portions 18 are in a substantially vertical array. The support member 16 is formed of a suitable metal, such as steel or aluminium, and the hook portions 18 are integrally formed with the support member 16 by being the pressed or punched from the material forming the support member 16.

Figure 2:
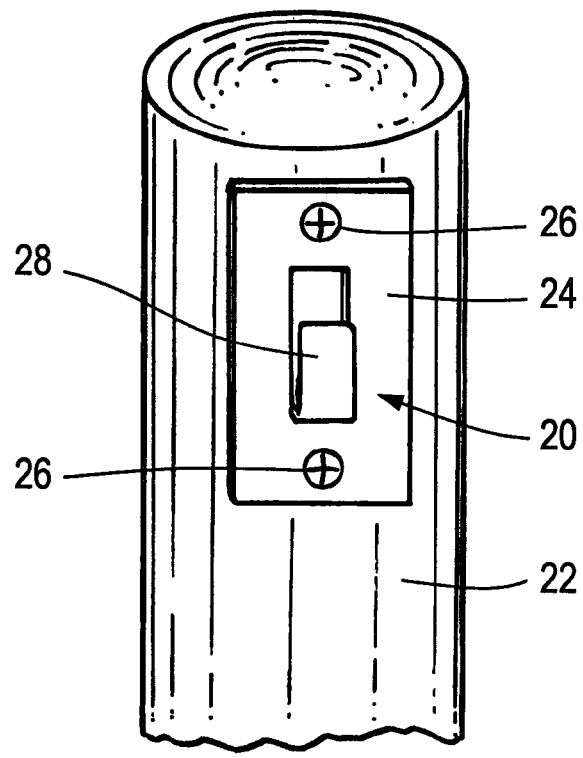
FIG. 2 shows a second embodiment of a support arrangement.

FIG. 2 shows an alternative support arrangement 20 for use with a support member 22 in which hook portions are difficult to form integrally. Such a support member 22 may be in the form of a wooden post.

The alternative support arrangement 20 comprises a substantially flat mounting member 24 fastened to the support member 22 by suitable fasteners, such as screws 26. The alternative support arrangement 20 further includes a hook portion 28, also in the form of a hook portion. The hook portion 28 is formed integrally with the mounting member 24 by punching or pressing. A plurality of the alternative support arrangements 20 can be fastened to the support member 22 one above the other lengthwise of the support member 22, so that, in use, the hook portions 28 are in a substantially vertical array.

The purpose of the hook portions 18, 28 is described below.

Figure 3:
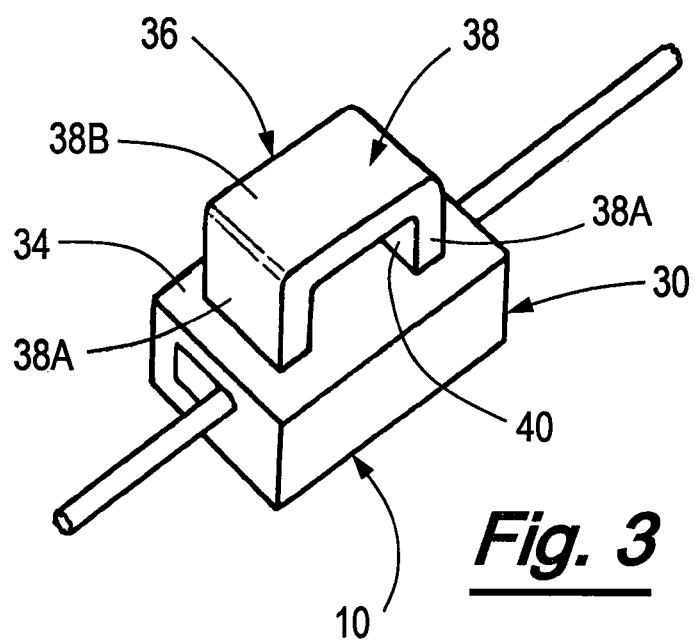
FIG. 3 is a rear perspective view of the clamping device shown in FIG. 1.

A rear view of the clamping device 10 is shown in FIG. 3. The clamping device 10 comprises a body 30 inside of which is a clamping arrangement 50 (see FIG. 8) for clamping the elongate member 12.

The body 30 has a front face 32, shown in FIG. 1, and a rear face 34, shown in FIG. 3. The rear face 34 is provided with the first cooperating formation 36 in the form of a receiving formation. The first cooperating formation 36 comprises a substantially U shaped member 38, defining a hook portion receiving aperture 40 for receiving the hook portion 18 or 28.

The U shaped member 38 has a pair of opposed side portions 38A and a bridging portion 38B extending between the side portions 38A.

Figure 4:
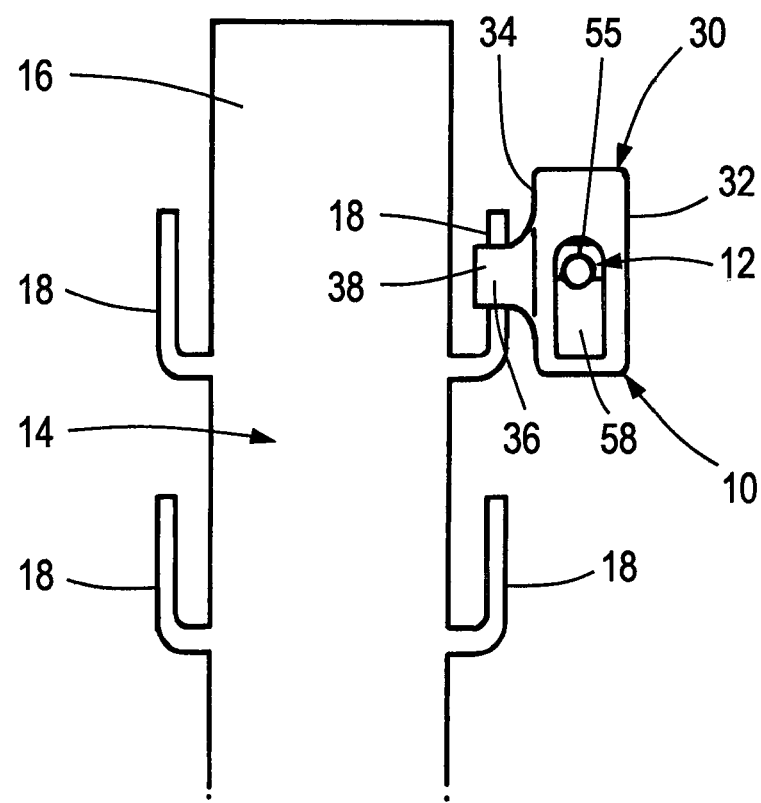
FIG. 4 is a schematic view of a support arrangement and a clamping device.

When the elongate member 12 is clamped to by the clamping device 10, the clamping device 10 can be supported on the support member 14 by arranging the clamping device 10 so that a selected one of the hook portions 18 on the support member 14 is received in the hook portion receiving aperture 40, as indicated by the arrow A in FIG. 1, and shown in FIG. 4. Where the support arrangements 20 are used, the clamping device 10 is supported on the support member 22 by arranging the clamping device 10 so that the hook portion 28 is received in the hook portion receiving aperture 40.

Figure 8:
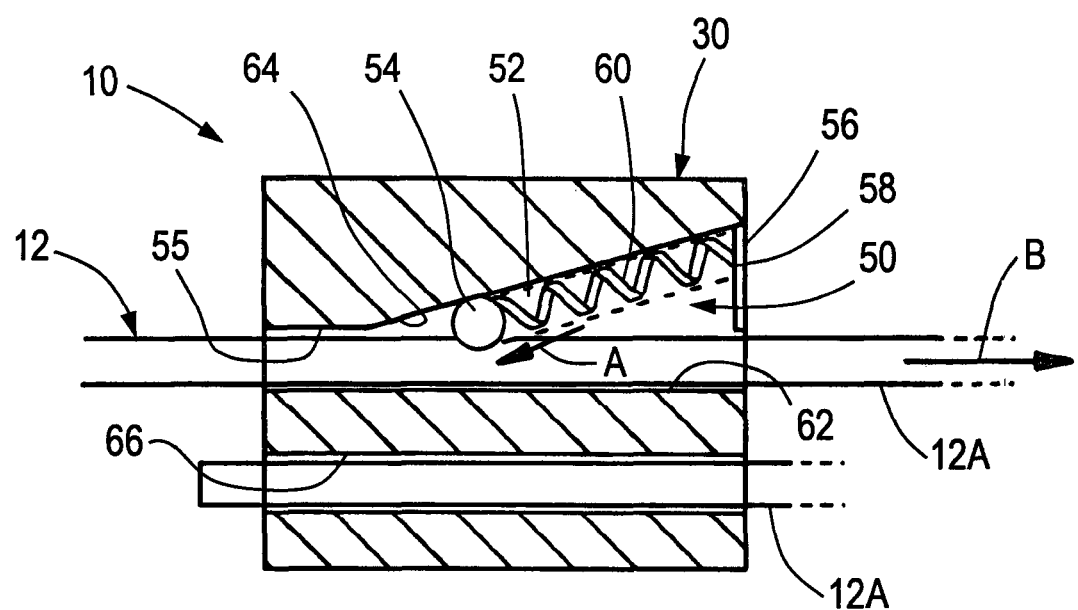
FIG. 8 is a sectional view of a clamping device.

Referring to FIG. 8, there is shown a sectional side view of the clamping device 10, showing the clamping arrangement 50. The clamping arrangement 50 comprises a space in the form of a channel 52 defined in the body 30 in which a clamping member 54 is held. The body 30 also defines a through passage 55 for the elongate member 12.

The channel 52 has a blind end 56. An abutment 58 is arranged across the blind end region 56.

The clamping arrangement 50 further includes an urging member in the form of a coiled compression spring 60. The clamping member 54 is urged by the compression spring 60 in the direction indicated by the arrow A towards the through passage 55. The compression spring 60 extends between the abutment 58 and the clamping member 54, the abutment 58 providing a reaction force against the compression spring, to enable the compression spring 60 to urge the clamping member 54 in the direction of the arrow A.

In the embodiment shown herein, the clamping member 54 is in the form of a cylinder, but it will be appreciated that the clamping member 54 could be any other suitable shape, for example a sphere or a wedge.

The through passage 55 is defined between the channel 52 and an article engaging wall 62 of the body 30. The channel 52 is defined between an inclined guide member, in the form of an inclined guide wall 64, and the through passage 55. The inclined guide wall 64 is inclined to the through passage 55 at an angle of between 10° and 30°. Thus, the clamping member 54 is urged towards the elongate member 12 at an acute angle thereto.

The through passage 55 is provided to receive therethrough the elongate member 12, as shown in FIG. 8. When the elongate member 12 is received therein, and before the clamping member 54 has been tightened against the elongate member 12, as explained below, the elongate member 12 can be moved through the through passage in the direction indicated by the arrow B.

When it is desired to clamp the elongate member 12 to the clamping device 10, the elongate member 12 is threaded through the passage 55 in the opposite direction to the direction indicated by the arrow B. The compression spring 60 holds the clamping member 54 in engagement with the elongate member 12. Movement of the elongate member 12 in said opposite direction thereby causes the clamping member 54 to move along the inclined guide wall 64 in the direction indicated by the arrow A.

Thus, the clamping member 54 is urged against the elongate member 12, by a combination of the action of the spring 60 and the inclination of the guide wall 64. As a result, the elongate member 12 is clamped tightly by the clamping member 54 which pushes the elongate member 12 against the article engaging wall 62.

An end region 12A of the elongate member 12 extends from the passage 55. In order for the end region 12A to be held securely out of the way, a holding passage 66 is defined through the body 30, to receive some of the end region 12A.

Figure 5:
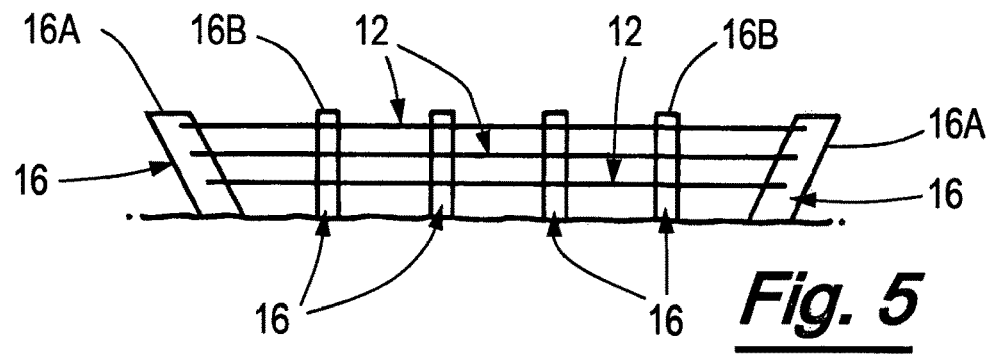
FIG. 5 is a schematic diagram of a securing assembly.

FIG. 5 is a schematic drawing of the securing assembly 100, which comprises a plurality of the upright support members 16. If desired, the securing assembly could comprise a plurality of the support members 28, or a combination of the support members 16 and 28.

The plurality of support members 16 comprise a pair of end support members 16A and a plurality of intermediate support members 16B arranged adjacent one another between the end support members 16A. In the embodiment shown in FIG. 5, the securing assembly 100 comprises four intermediate support members 16B, although any other suitable number can be used. The support members 16B are substantially the same as the support members 16A.

Figure 6:
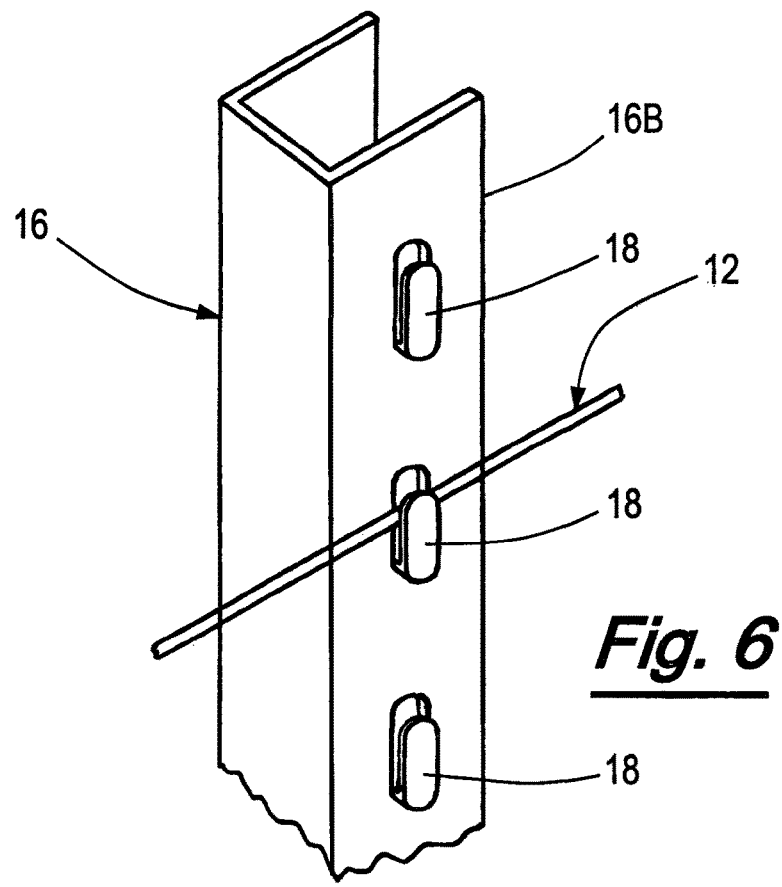
FIG. 6 shows an intermediate support arrangement, being part of the securing assembly.
Figure 7:
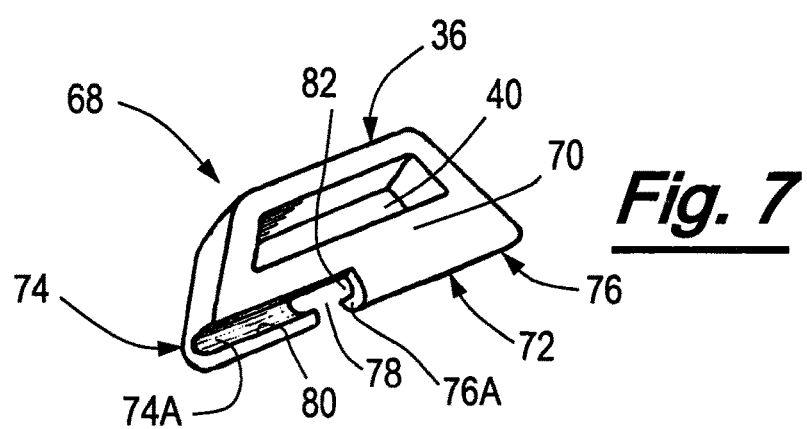
FIG. 7 is a perspective view of a protecting device.

One of the support members 16A is shown in FIG. 6, and comprises a plurality of the hook portions 18. The elongate members 12 (only one of which is shown in FIG. 6 extend through the hook portions 18. In order to prevent elongate member 12 from rubbing against the hook portion 18 and becoming damaged, a protecting device 68 is provided. The protecting device 68 is shown in FIG. 7

The protecting device 68 comprises a central main part 70 and a channel arrangement 72 on the main part 70 to receive the elongate member 12 therethrough. The channel arrangement 72 comprises a first channel portion 74 defining a first channel 74A to receive a first region of the elongate member 12, and a second channel portion 76 defining a second channel 75A to receive a second region of the elongate member 12.

The first and second channels 74A, 76A are aligned with each other so that when the first and second regions of the elongate member 12 are received therein, the elongate member extends through the channel arrangement in a substantially straight line. The first channel portion 74 is spaced from the second channel portion 76 to define a gap 78 therebetween.

The first channel portion 74 has a first elongate opening 80 along a first side of the main part 70 to receive said first region of the elongate member 12. The first elongate opening extends wholly the length of the first channel portion 74.

The second channel portion 76 has a second elongate opening 82 along a second opposite side of the main part to receive said first region of the elongate member. The second elongate opening 82 extends wholly the length of the second channel portion 76. The first and second openings 80, 82 face in opposite directions.

The protecting device 68 further includes one of the first cooperating formation 36 on the main part 70 to cooperate with a selected one of the hook portions 18 on one of the intermediate support arrangements 16B. The first cooperating formation 36 on the main part 70 defines an aperture 40 to receive the hook portion 18.

Referring to FIGS. 9, 10 and 11, the protecting device 68 is mounted on the elongate member 12 by first arranging the protecting device so that the channel arrangement 72 is disposed transverse to the elongate member 12, and the elongate member 12 is received in the gap 78, as shown in FIG. 9.

The protecting device is then rotated about the gap 78, as shown by the arrow X, so that a first region of the elongate member 12 is received in the first channel portion 74, and a second region of the elongate member 12 is received in the second channel portion 76, as shown in FIG. 10.

When the protecting device is arranged on the elongate member as shown in FIG. 10, the first cooperating formation 36 extends away from the hook portion. In order to attach the protecting device 68 to the hook portion 18 and, thereby, secure the elongate member 12 to the hook portion 18, the protecting device 68 can be rotated about the elongate member 12, as shown by the arrow Y. The hook portion 18 can then be received in the aperture 40, as shown in FIG. 11.

The securing assembly 100 comprises three of the elongate members 12, each of which is secured to the end support members 16A by the clamping devices 10 as described above.

In order to secure the elongate members 12 to the support members 16B, a plurality of the protecting devices 68 are mounted on the elongate members 12. Each protecting device 68 can then secure the elongate members 12 to a respective hook portion 18.

The securing arrangement 100 is used to support plants, such as vines, while they are growing. The vines are attached to the elongate members 12 in a known manner. The elongate members are secured to the support members 16 as described above.

As the vine grows, the elongate member 12 to which the vine is attached can be lifted from a lower array of hook portions 18 to a higher array. This can be easily achieved by removing the clamping devices 10 and the protecting devices 68 from the hook portions to which they are secured and moving the clamping devices 10 and the protecting devices 68 to higher hook portions 18.

There is thus described a securing assembly 100 which is used to assist in the growing of plants such as vines. The securing assembly 100 described above has the advantage that the use of the clamping devices 10 is more secure and more easy to move from hook portion 18 to hook portion 18 than prior art assemblies.

Also, the present invention avoids the need to use nails or screws in the posts to support the elongate members. In addition the provision of the protecting device 68 provides the advantage that there is a reduction in wear on the elongate member, because it does not rub against the hook portions, thereby reducing the risk of the elongate member breaking.

A further advantage is that the clamping devices 10 and the protecting devices 68 can be fitted to the elongate members after they have been installed, and the plants attached thereto.

Figure 12:
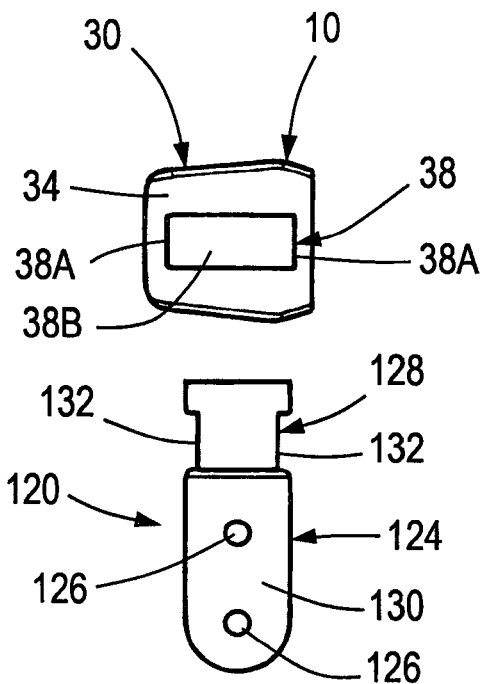
FIG. 12 shows a third embodiment of a support arrangement and the clamping device.
Figure 13:
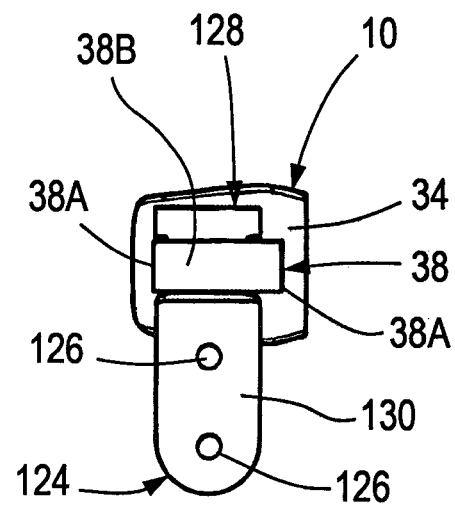
FIG. 13 shows the clamping device on the third embodiment of the support arrangement.
Figure 14:
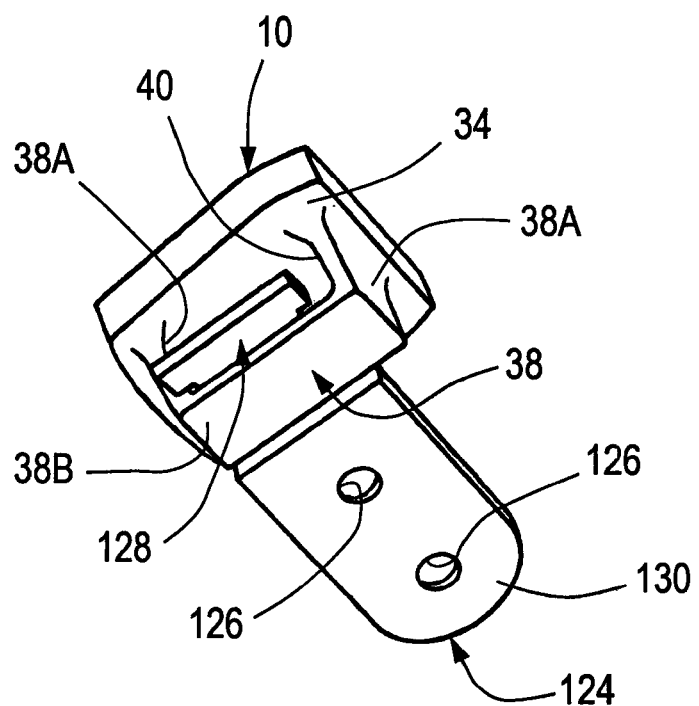
FIG. 14 is a perspective view of the clamping device on the third embodiment of the support arrangement.

Various modifications can be made without departing from the scope of the invention. An example of a modification is shown in FIGS. 12 to 14, in which a further alternative support arrangement 120 is provided.

The further alternative support arrangement 120 comprises a mounting member 124 fastened to the support member 22 (not shown in FIGS. 12 to 14) by suitable fasteners, such as screws (not shown in FIGS. 12 to 14) inserted through apertures 126 defined in the mounting member 124.

The support arrangement 120 further includes a hook portion 128 which projects upwardly from the mounting member 124. FIGS. 12 and 13 are rear views of the support arrangement 120, showing the rear face 130 of the mounting member 124. In use, the rear face 130 engages the support member 22.

The hook portion 128 is offset forwards from the mounting member 124, so that a gap is defined between the hook portion 128 and the support member 22 when the support arrangement 120 is fastened to the support member 22.

The hook portion 128 defines a pair of opposite recesses 132 into either of which one of the side portions 38A can be received when tension is applied to the elongate member 12 (also not shown in FIGS. 12 to 14).

In use, one of the elongate members 12 is clamped by the clamping device 10 to secure the elongate member 12 thereto. The clamping device 10 is supported on the support arrangement 120 by arranging the hook portion 128 so that it is received in the aperture 40.

The elongate member 12 can then be pulled tight which has the effect of pulling the clamping device so that one of the side portions 38A is received in one of the recesses 132, thereby securing the clamping device 10 on the support arrangement 120.

The invention claimed is:

1. A clamping device comprising:
a body and a clamping arrangement in the body for clamping a flexible elongate member, the body having opposite front and rear faces, and opposite ends, the front and rear faces extending between the opposite ends;
wherein the body defines a through passage for the elongate member, the through passage extending from one end to the other end, and the body includes a guide formation extending towards the through passage, and wherein the clamping arrangement comprises a clamping member movable along the guide formation towards the through passage to clamp the elongate member in the through passage, the clamping arrangement further including an urging member to urge the clamping member towards the through passage, the guide formation being inclined relative to the through passage, and the body comprises an engaging wall, the through passage extending along the engaging wall:
wherein the clamping member is urged by the urging member along the guide formation towards the engaging wall to a clamping position, in which the clamping member and the elongate member are clamped between the guide formation and the engaging wall: and a first cooperating formation for cooperating with a second cooperating formation, said second cooperating formation being part of a support arrangement to support the clamping device; wherein the first cooperating formation comprises a pair of opposed side portions and a bridging portion extending between the side portions, each of the side portions being attached to the rear face.

2. A clamping device according to claim 1, wherein the first cooperating formation comprises a substantially U shaped member, an aperture for receiving the second cooperating formation being defined between the U-shaped member and the rear face.

3. A clamping device according to claim 1, wherein the body defines a space in communication with the through passage, and the guide formation constitutes a wall of the space extending along the space.

4. A securing assembly comprising:
a clamping device having a body, the body having opposite front and rear faces, and opposite ends, the front and rear faces extending between the opposite ends;

a clamping arrangement in the body, wherein the body defines a through passage for the elongate member, the through passage extending from one end to the other end, and the body includes a guide formation extending towards the through passage, and wherein the clamping arrangement comprises a clamping member movable along the guide formation towards the through passage to clamp the elongate member in the through passage, the clamping arrangement further including an urging member to urge the clamping member towards the through passage; and the securing assembly further including a flexible elongate member which can be clamped by the clamping arrangement;

a first cooperating formation on the body; and a support arrangement for supporting the clamping device, the support arrangement comprising a second cooperating formation, wherein the first cooperating formation can cooperate with the second cooperating formation to support the clamping device;

wherein the first cooperating formation comprises the receiving formation, and the second cooperating formation comprises a hook portion;

wherein the hook portion defines opposite recesses to hold the first cooperating formation; and wherein the receiving formation comprises a pair of opposed side portions and a bridging portion extending between the side portions, each of the side portions being attached to the rear face.

5. A securing assembly according to claim 4, wherein the receiving formation comprises a substantially U shaped member, an aperture for receiving the second cooperating formation being defined between the U-shaped member and the rear face.

6. A securing assembly according to claim 4, wherein the body defines a space in communication with the through passage, and the guide formation constitutes a wall of the space extending along the space, the guide formation being inclined relative to the through passage, and wherein the body comprises an engaging wall, and the through passage extends along the engaging wall, the clamping member being urged by the urging means towards the engaging wall to clamp the elongate member against the engaging wall.

7. A securing assembly according to claim 4, wherein the support arrangement comprises a support member and the second cooperating formation is provided on the support member.

8. A securing assembly according to claim 7, wherein the support arrangement comprises a plurality of the second cooperating formations on the support member, the second formations being arranged sequentially in a vertical array on the support member.

9. A securing assembly according to claim 4, wherein the support arrangement comprises a mounting member, the second cooperating formation being on the mounting member, the mounting member being capable of being fastened to a support member.

10. A securing assembly according to claim 9, wherein a plurality of the support arrangements can be fastened to the support member, the plurality of support arrangements being arranged sequentially in a vertical array on the support member.

11. A securing assembly according to claim 9, wherein the second cooperating formation extends upwardly from the mounting member.

12. A method of using a securing assembly as claimed in claim 4, said method comprising providing an elongate member and a clamping device, securing the clamping device at one end region of the elongate member, the clamping device having a first cooperating formation, providing a support arrangement having a plurality of second cooperating formations arranged in a vertical array, and supporting the clamping device on a selected one of the second cooperating formations by effecting cooperation between the first and the selected second cooperating formations, and moving the clamping device to another selected second cooperating formation by effecting cooperation between the first and the other selected second cooperating formations.

13. A method according to claim 12, wherein the method comprises providing two clamping devices, securing each clamping device at respective opposite end regions of the elongate member, each clamping device having a respective first cooperating formation.

14. A method according to claim 13, wherein the method comprises providing two support arrangements, each having a plurality of the second cooperating formations arranged in a vertical array, and supporting each clamping device on a selected one of the second cooperating formations of the respective support arrangements by effecting cooperation between the respective first and the selected second cooperating formations.

15. A method according to claim 13, wherein the method comprises moving each clamping device to a selected further second cooperating formation to support each clamping device on the respective selected further second cooperating formation by effecting cooperation between the first and the selected further second cooperating formations.

* * * * *